US007823987B2

(12) United States Patent  (10) Patent No.: US 7,823,987 B2
Dandurand et al.  (45) Date of Patent: Nov. 2, 2010

(54) DRIVE TRACK FOR SNOWMOBILE OR TRACKED VEHICLE

(75) Inventors: Jules Dandurand, Sherbrooke (CA); Denis Courtemanche, Richmond (CA)

(73) Assignee: Camoplast Inc., Sherbrooke (CA)

( * ) Notice: Subject to any disclaimer, the term of this patent is extended or adjusted under 35 U.S.C. 154(b) by 107 days.

(21) Appl. No.: 11/434,057

(22) Filed: May 16, 2006

(65) Prior Publication Data

US 2006/0273660 A1 Dec. 7, 2006

(30) Foreign Application Priority Data

Jun. 2, 2005 (CA) ................................. 2,509,059

(51) Int. Cl.
  *F16G 1/00*  (2006.01)
  *B62D 55/24*  (2006.01)
(52) U.S. Cl. .................. 305/166; 305/170; 305/171
(58) Field of Classification Search ........ 305/165–171, 305/177, 157–158, 172–176, 178–184; 474/266–267, 474/260–262
  See application file for complete search history.

(56) References Cited

U.S. PATENT DOCUMENTS

| 1,924,354 | A | * | 8/1933 | Freedlander | ................ 474/261 |
|---|---|---|---|---|---|
| 2,793,150 | A | * | 5/1957 | Deaves | ........................ 305/166 |
| 3,480,339 | A |   | 11/1969 | Kell |  |
| 3,485,707 | A | * | 12/1969 | Spicer | ......................... 442/214 |
| 3,704,918 | A | * | 12/1972 | Perreault | ..................... 305/168 |
| 3,712,689 | A |   | 1/1973 | Chaumont |  |
| 3,721,477 | A |   | 3/1973 | Cooper et al. |  |
| 3,858,948 | A |   | 1/1975 | Johnson et al. |  |
| 5,145,242 | A | * | 9/1992 | Togashi | ....................... 305/171 |
| 5,380,076 | A | * | 1/1995 | Hori | ............................ 305/171 |
| 5,593,218 | A | * | 1/1997 | Katoh et al. | ................. 305/174 |
| 5,730,510 | A |   | 3/1998 | Courtemanche |  |
| 6,007,912 | A | * | 12/1999 | Doujak | ........................ 428/379 |
| 6,109,705 | A |   | 8/2000 | Courtemanche |  |
| 6,203,125 | B1 |   | 3/2001 | Arakawa et al. |  |
| 6,406,655 | B1 |   | 6/2002 | Courtemanche |  |
| 6,811,877 | B2 | * | 11/2004 | Haislet et al. | ................ 428/377 |
| 7,304,006 | B2 | * | 12/2007 | Lee et al. | ..................... 442/207 |
| 2001/0009336 | A1 | * | 7/2001 | Hori | ............................ 305/189 |
| 2002/0067074 | A1 | * | 6/2002 | Katayama et al. | ............ 305/170 |
| 2002/0175563 | A1 | * | 11/2002 | Katayama | .................... 305/165 |
| 2006/0105874 | A1 | * | 5/2006 | Shimamura | ................. 474/266 |

* cited by examiner

*Primary Examiner*—Jason R Bellinger
(74) *Attorney, Agent, or Firm*—Paul E. White, Jr.; Manelli Denison & Selter PLLC

(57) ABSTRACT

A track formed of a molded rubber base sandwiching a cord layer, followed by a cross bar and a single layer of ply fabric extending longitudinally of the track.

55 Claims, 5 Drawing Sheets

DRIVE TRACK FOR SNOWMOBILE OR TRACKED VEHICLE

CROSS REFERENCE TO RELATED APPLICATIONS

This application claims priority on Canadian application no. 2,509,059, filed on Jun. 2, 2005. All documents above are herein incorporated by reference.

FIELD OF THE INVENTION

The present invention pertains to a drive track and, more particularly, to a track for snowmobiles or other tracked vehicles, having an improved construction to decrease horse power, increase top speed and improve durability of the track when the latter is driven at high rotational speeds.

BACKGROUND OF THE INVENTION

Endless drive tracks for propelling, for example, a snowmobile over snow, ice or other similar ground structure, are known in the art. The mounting of this track to a snowmobile and the mounting of such track on an all-terrain vehicle are well known. The track has a ground engaging outer side and an inner side that receives and supports, on the lower run thereof, a suspension which may consist of a wheel assembly or a slide rail assembly, both of which are also well known in the art.

Conventionally, the track rotates by means of a motor driven sprocket unit at the forward end of the vehicle and idle drive wheels are mounted at the aft end of the vehicle to support the rear end of the track. Sprockets engage a series of lugs integrally formed with the inner surface of the track.

With reference to FIG. 1, the endless body is generally formed of a molded rubber base having, embedded therein, a first layer of reinforcing fabric 38 extending longitudinally of the track, a series of laterally spaced cord strands 40 which extend between the first layer of fabric and beneath a rod 34, and a second ply 36 fabric disposed above the rod 34. Such arrangement has been shown to allow good track performance and longevity. It is generally believed that an increased amount of fabric contributes these performances. In areas of the track where there is no rod 34, it is about at mid-thickness of the track where the fiber of the rubber is the strongest, this line of zero stress in cross section of the track separating the region of compressive stress from that of tensile stress being known as the neutral fiber.

In spite of efforts in this field, there is still a need for a lighter, cost effective track.

SUMMARY OF THE INVENTION

More specifically, there is provided a track for a tracked vehicle, comprising a molded rubber base sandwiching a cord layer, followed by a cross bar and a single layer of ply fabric extending longitudinally of the track.

Other objects, advantages and features of the present invention will become more apparent upon reading of the following non-restrictive description of embodiments thereof, given by way of example only with reference to the accompanying drawings.

DESCRIPTION OF EMBODIMENTS OF THE INVENTION

Figure 1:
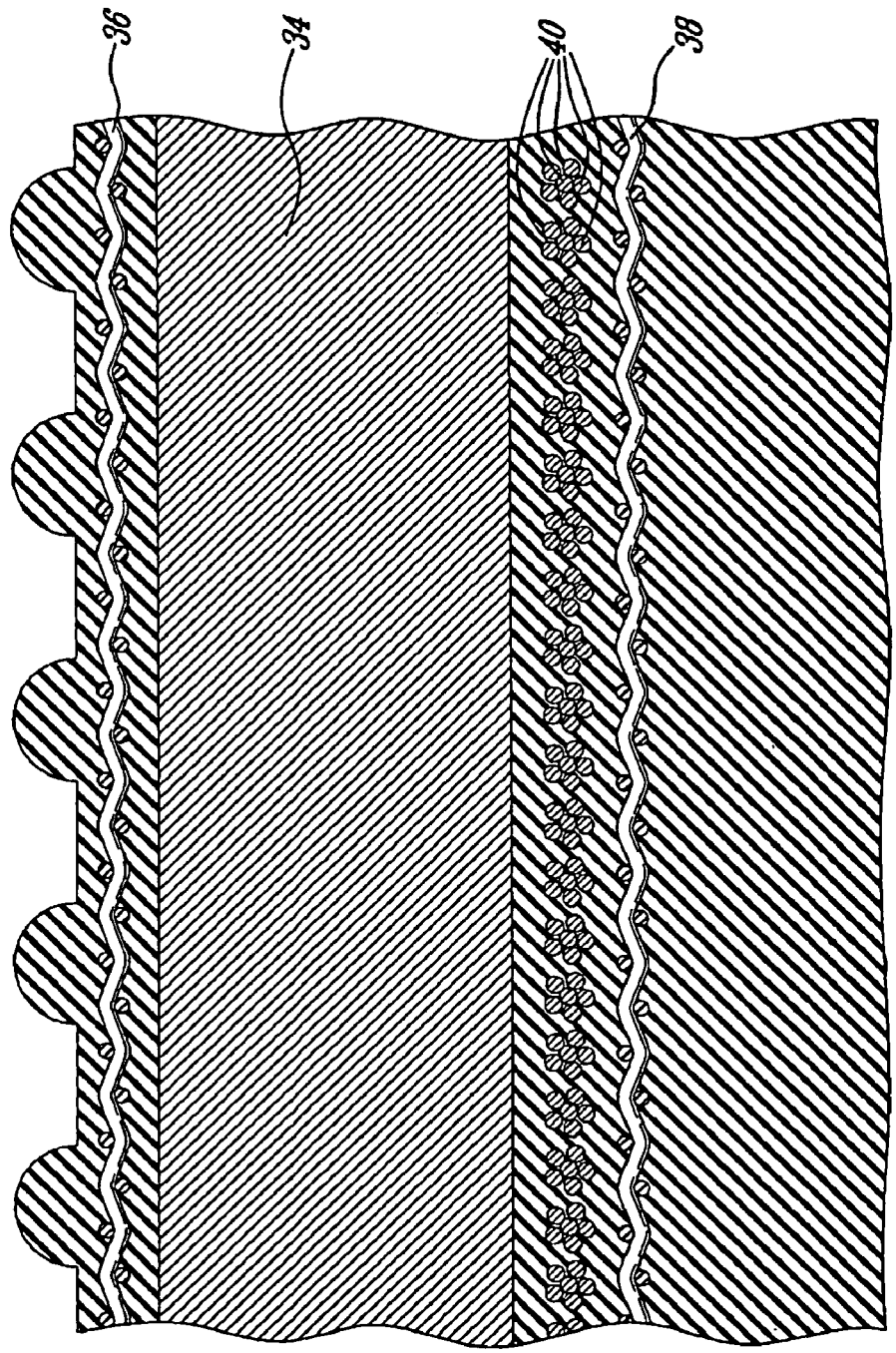
FIG. 1 is a cross section of a track as known in the art.
Figure 2:
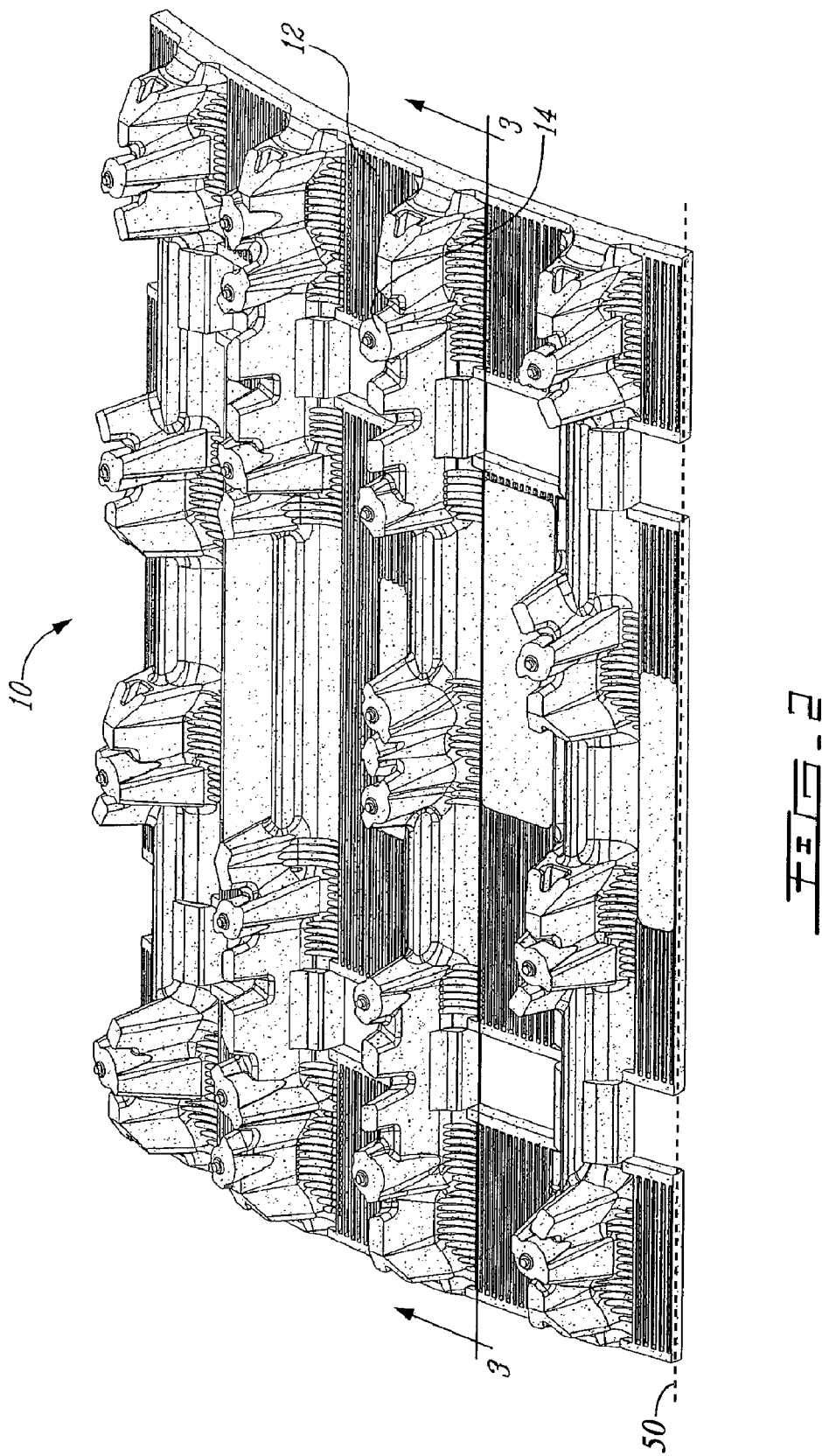
FIG. 2 is a perspective view of a portion of a track according to an embodiment of the present invention.

As shown in FIG. 2, a track 10 according to an embodiment of the present invention comprises a ground engaging outer side 12 and an inner side (not seen in FIG. 2).

Figure 3:
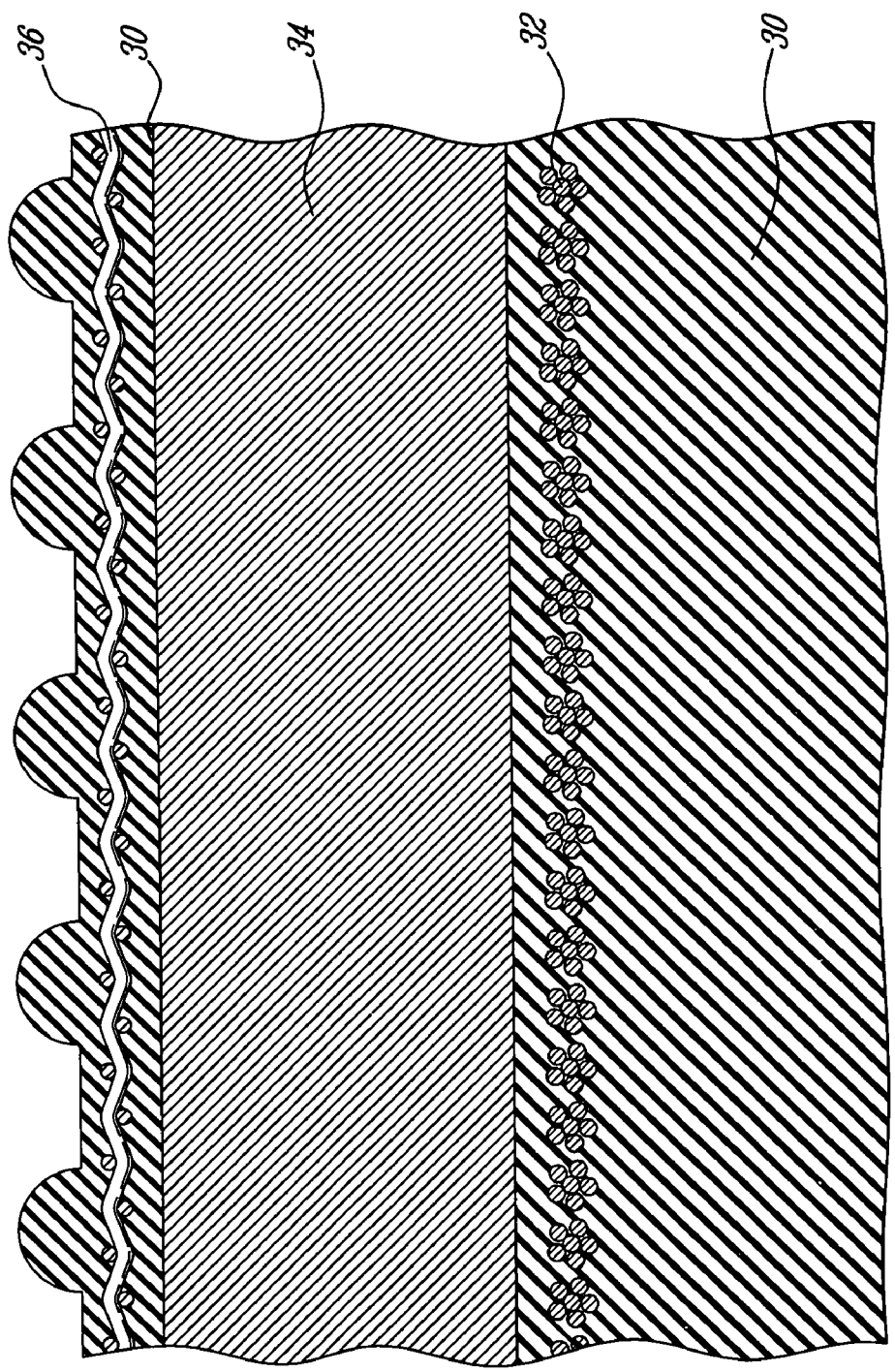
FIG. 3 is a cross-sectional view of the of FIG. 2.

As seen in the cross-section of FIG. 3, the track 10 is formed of a molded rubber base 30 sandwiching a cord layer 32, followed by a cross bar 34 and a single layer of ply fabric 36 extending longitudinally of the track.

The cross bar 34 may consists of a rod as known in the art, made of composite material for example. It is located at spaced intervals along the longitudinal direction of the track beneath the profiles 14 projecting from the outer side 12 of the track.

The cord layer 32 comprises a dense strand arrangement formed of a twist arrangement of strands, comprising for example at least 18 strands per inch for a cord of 1.25 mm. The strands include high strength, light weight materials such as man made fibers, such as Kevlar™, nylon, and polyester fabric for example The cord layer 32 extends on the rubber base 30 and passes beneath the rod 34.

The cord layer 32 may be discontinued at locations of the track where the idler wheels pass.

The ply of fabric 36 includes woven man-made fibers such as nylon for example.

Figure 4:
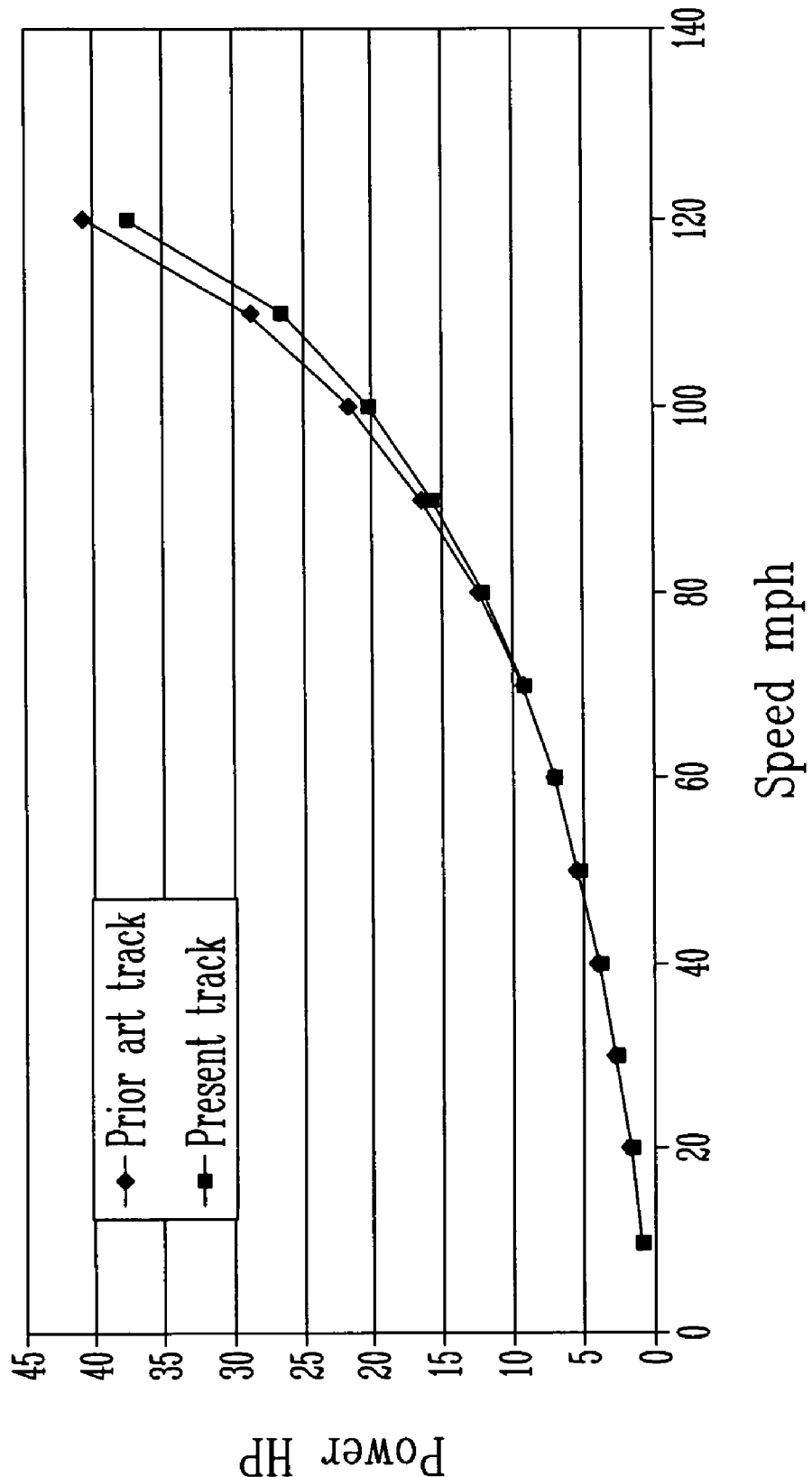
FIG. 4 is a graph of power as a function of speed, used by a track according to the present invention, in a test without traction.
Figure 5:
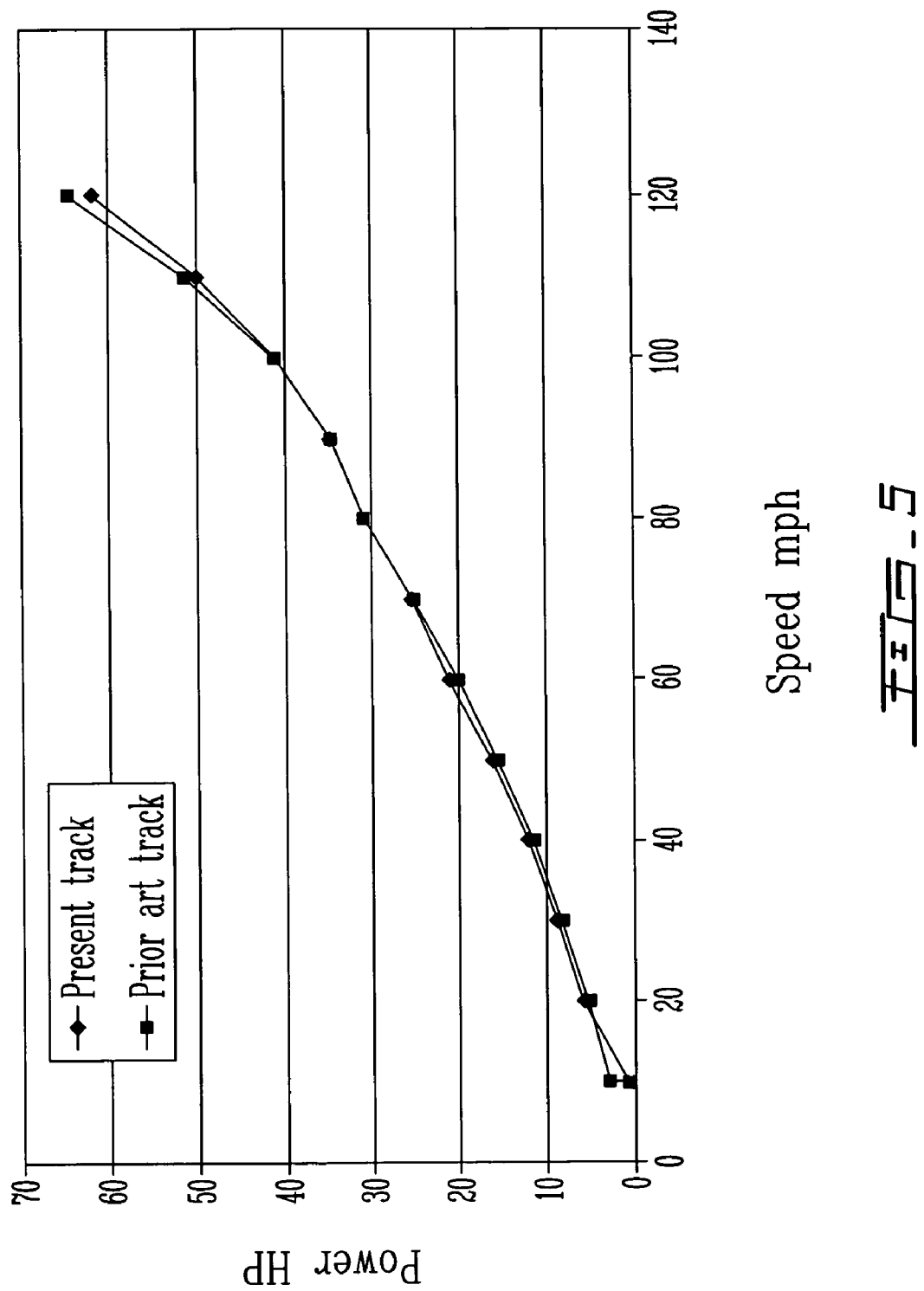
FIG. 5 is a graph of power as a function of speed, used by a track according to the present invention, in a test including traction.

As shown in FIGS. 4 and 5, the present track is found to necessitate equal or less power, which goes against the current belief in the industry that the greater the amount of fabric in the track composition, the better the performances.

People in the art will appreciate that the present invention provides, in contrast to a track standardly made in the art and including an arrangement of rubber, a first ply fabric, cord, rod, second ply fabric and rubber, a track comprising a single layer of ply fabric, yielding a track of reduced thickness, weight and cost, while maintaining target performances thereof in terms of power and longevity. In particular, the present composition is shown to decrease horse power, increase top speed and improve durability of the track when the latter is driven at high rotational speeds. It has also been found to optimize the so-called neutral fiber 50 bringing it closer to the outer side of the track.

The present track may be used for a range of tracked vehicles.

Although the present invention has been described hereinabove by way of embodiments thereof, it may be modified, without departing from the nature and teachings of the subject invention as defined in the appended claims.

What is claimed is:

1. An endless snowmobile track for traction of a snowmobile, the endless snowmobile track comprising:
   a) a rubber-based body having:
      an inner side for facing a driving wheel of the snowmobile; and
      a ground-engaging outer side for engaging a ground surface on which the snowmobile travels; and
   b) a plurality of cross bars embedded within the rubber-based body, spaced apart from one another along a longitudinal direction of the endless snowmobile track, and extending transversally to the longitudinal direction of the endless snowmobile track;

the endless snowmobile track having a single ply of reinforcing woven fabric, the single ply of reinforcing woven fabric being embedded within the rubber-based body.

2. An endless snowmobile track as claimed in claim 1, wherein the single ply of reinforcing woven fabric is closer to the ground-engaging outer side than to the inner side in a thickness direction of the endless snowmobile track.

3. An endless snowmobile track as claimed in claim 1, wherein the single ply of reinforcing woven fabric is located within the rubber-based body such that a neutral area separating a region of compressive stress of the endless snowmobile track and a region of tensile stress of the endless snowmobile track is closer to the ground-engaging outer side than to the inner side in a thickness direction of the endless snowmobile track.

4. An endless snowmobile track as claimed in claim 1, wherein the single ply of reinforcing woven fabric comprises woven man-made fibers.

5. An endless snowmobile track as claimed in claim 1, comprising a layer of cords embedded within the rubber-based body and extending generally parallel to one another and in the longitudinal direction of the endless snowmobile track, each cord including a plurality of strands.

6. An endless snowmobile track as claimed in claim 5, wherein the strands of each cord are twisted.

7. An endless snowmobile track as claimed in claim 5, wherein the strands of each cord are made of at least one of Kevlar™, nylon and polyester.

8. An endless snowmobile track as claimed in claim 1, wherein the single ply of reinforcing woven fabric is located between the cross bars and the ground-engaging outer side.

9. An endless snowmobile track as claimed in claim 8, comprising a layer of cords embedded within the rubber-based body and extending generally parallel to one another and in the longitudinal direction of the endless snowmobile track, each cord including a plurality of strands, the layer of cords being located between the cross bars and the inner side.

10. An endless snowmobile track as claimed in claim 1, wherein each cross bar comprises composite material.

11. A snowmobile comprising an endless snowmobile track as claimed in claim 1.

12. An endless all-terrain vehicle (ATV) track for traction of an ATV, the endless ATV track comprising:
  a) a rubber-based body having:
    an inner side for facing a driving wheel of the ATV; and
    a ground-engaging outer side for engaging a ground surface on which the ATV travels; and
  b) a plurality of traction projections on the ground-engaging outer side, the traction projections engaging the ground surface when the ATV travels on the ground surface;
  the endless ATV track having a single ply of reinforcing woven fabric, the single ply of reinforcing woven fabric being embedded within the rubber-based body.

13. An endless ATV track as claimed in claim 12, wherein the single ply of reinforcing woven fabric is closer to the ground-engaging outer side than to the inner side in a thickness direction of the endless ATV track.

14. An endless ATV track as claimed in claim 12, wherein the single ply of reinforcing woven fabric is located within the rubber-based body such that a neutral area separating a region of compressive stress of the endless ATV track and a region of tensile stress of the endless ATV track is closer to the ground-engaging outer side than to the inner side in a thickness direction of the endless ATV track.

15. An endless ATV track as claimed in claim 12, wherein the single ply of reinforcing woven fabric comprises woven man-made fibers.

16. An endless ATV track as claimed in claim 12, comprising a layer of cords embedded within the rubber-based body and extending generally parallel to one another and in a longitudinal direction of the endless ATV track, each cord including a plurality of strands.

17. An endless ATV track as claimed in claim 16, wherein the strands of each cord are twisted.

18. An endless ATV track as claimed in claim 16, wherein the strands of each cord are made of at least one of Kevlar™, nylon and polyester.

19. An endless ATV track as claimed in claim 12, comprising a plurality of cross bars embedded within the rubber-based body, spaced apart from one another along a longitudinal direction of the endless ATV track, and extending transversally to the longitudinal direction of the endless ATV track.

20. An endless ATV track as claimed in claim 19, wherein the single ply of reinforcing woven fabric is located between the cross bars and the ground-engaging outer side.

21. An endless ATV track as claimed in claim 20, comprising a layer of cords embedded within the rubber-based body and extending generally parallel to one another and in the longitudinal direction of the endless ATV track, each cord including a plurality of strands, the layer of cords being located between the cross bars and the inner side.

22. An endless ATV track as claimed in claim 19, wherein each cross bar comprises composite material.

23. An ATV comprising an endless ATV track as claimed in claim 12.

24. An endless snowmobile track as claimed in claim 4, wherein the woven man-made fibers are woven nylon fibers.

25. An endless snowmobile track as claimed in claim 1, comprising a layer of cords embedded within the rubber-based body and extending generally parallel to one another and in the longitudinal direction of the endless snowmobile track, the single ply of reinforcing woven fabric being spaced apart from the layer of cords in a thickness direction of the endless snowmobile track.

26. An endless snowmobile track as claimed in claim 1, wherein, when operated at a given speed, the endless snowmobile track consumes less power than if the endless snowmobile track had two plies of reinforcing woven fabric.

27. An endless ATV track as claimed in claim 15, wherein the woven man-made fibers are woven nylon fibers.

28. An endless ATV track as claimed in claim 12, comprising a layer of cords embedded within the rubber-based body and extending generally parallel to one another and in a longitudinal direction of the endless ATV track, the single ply of reinforcing woven fabric being spaced apart from the layer of cords in a thickness direction of the endless ATV track.

29. An endless ATV track as claimed in claim 12, wherein, when operated at a given speed, the endless ATV track consumes less power than if the endless ATV track had two plies of reinforcing woven fabric.

30. An endless snowmobile track as claimed in claim 26, wherein the given speed is above 100 miles per hour.

31. An endless ATV track as claimed in claim 29, wherein the given speed is above 100 miles per hour.

32. An endless ATV track as claimed in claim 12, wherein individual ones of the traction projections are spaced apart from one another along a longitudinal direction of the endless ATV track.

33. An endless ATV track as claimed in claim 32, wherein individual ones of the traction projections are spaced apart from one another along a widthwise direction of the endless ATV track.

34. An endless ATV track as claimed in claim 12, wherein a given one of the traction projections comprises a first part having a first height and a second part having a second height different from the first height, each of the first height and the second height being measured along a thickness direction of the endless ATV track.

35. An endless ATV track as claimed in claim 12, wherein a given one of the traction projections comprises a first part having a first thickness and a second part having a second thickness different from the first thickness, each of the first thickness and the second thickness being measured along the longitudinal direction of the endless ATV track.

36. An endless snowmobile track for traction of a snowmobile, the endless snowmobile track comprising:
   a) a rubber-based body having:
      an inner side for facing a driving wheel of the snowmobile; and
      a ground-engaging outer side for engaging a ground surface on which the snowmobile travels; and
   b) a plurality of traction projections on the ground-engaging outer side, the traction projections engaging the ground surface when the snowmobile travels on the ground surface;
the endless snowmobile track having a single ply of reinforcing woven fabric, the single ply of reinforcing woven fabric being embedded within the rubber-based body.

37. An endless snowmobile track as claimed in claim 36, wherein the single ply of reinforcing woven fabric is closer to the ground-engaging outer side than to the inner side in a thickness direction of the endless snowmobile track.

38. An endless snowmobile track as claimed in claim 36, wherein the single ply of reinforcing woven fabric is located within the rubber-based body such that a neutral area separating a region of compressive stress of the endless snowmobile track and a region of tensile stress of the endless snowmobile track is closer to the ground-engaging outer side than to the inner side in a thickness direction of the endless snowmobile track.

39. An endless snowmobile track as claimed in claim 36, wherein the single ply of reinforcing woven fabric comprises woven man-made fibers.

40. An endless snowmobile track as claimed in claim 39, wherein the woven man-made fibers are woven nylon fibers.

41. An endless snowmobile track as claimed in claim 36, comprising a layer of cords embedded within the rubber-based body and extending generally parallel to one another and in a longitudinal direction of the endless snowmobile track, each cord including a plurality of strands.

42. An endless snowmobile track as claimed in claim 41, wherein the strands of each cord are twisted.

43. An endless snowmobile track as claimed in claim 41, wherein the strands of each cord are made of at least one of Kevlar™, nylon and polyester.

44. An endless snowmobile track as claimed in claim 36, comprising a plurality of cross bars embedded within the rubber-based body, spaced apart from one another along a longitudinal direction of the endless snowmobile track, and extending transversally to the longitudinal direction of the endless snowmobile track.

45. An endless snowmobile track as claimed in claim 44, wherein the single ply of reinforcing woven fabric is located between the cross bars and the ground-engaging outer side.

46. An endless snowmobile track as claimed in claim 44, comprising a layer of cords embedded within the rubber-based body and extending generally parallel to one another and in the longitudinal direction of the endless snowmobile track, each cord including a plurality of strands, the layer of cords being located between the cross bars and the inner side.

47. An endless snowmobile track as claimed in claim 44, wherein each cross bar comprises composite material.

48. An endless snowmobile track as claimed in claim 36, comprising a layer of cords embedded within the rubber-based body and extending generally parallel to one another and in a longitudinal direction of the endless snowmobile track, the single ply of reinforcing woven fabric being spaced apart from the layer of cords in a thickness direction of the endless snowmobile track.

49. An endless snowmobile track as claimed in claim 36, wherein, when operated at a given speed, the endless snowmobile track consumes less power than if the endless snowmobile track had two plies of reinforcing woven fabric.

50. An endless snowmobile track as claimed in claim 49, wherein the given speed is above 100 miles per hour.

51. An endless snowmobile track as claimed in claim 36, wherein individual ones of the traction projections are spaced apart from one another along a longitudinal direction of the endless snowmobile track.

52. An endless snowmobile track as claimed in claim 51, wherein individual ones of the traction projections are spaced apart from one another along a widthwise direction of the endless snowmobile track.

53. An endless snowmobile track as claimed in claim 36, wherein a given one of the traction projections comprises a first part having a first height and a second part having a second height different from the first height, each of the first height and the second height being measured along a thickness direction of the endless snowmobile track.

54. An endless snowmobile track as claimed in claim 36, wherein a given one of the traction projections comprises a first part having a first thickness and a second part having a second thickness different from the first thickness, each of the first thickness and the second thickness being measured along the longitudinal direction of the endless snowmobile track.

55. A snowmobile comprising an endless snowmobile track as claimed in claim 36.

* * * * *